United States Patent
Lee et al.

(10) Patent No.: US 10,155,204 B2
(45) Date of Patent: Dec. 18, 2018

(54) HIGH-FUNCTIONAL POLYAMIDE-BASED DRY WATER TREATMENT SEPARATOR AND METHOD FOR MANUFACTURING SAME

(71) Applicant: LG CHEM, LTD., Seoul (KR)

(72) Inventors: Youngju Lee, Daejeon (KR); Byungho Jeon, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 184 days.

(21) Appl. No.: 15/104,917

(22) PCT Filed: Dec. 24, 2014

(86) PCT No.: PCT/KR2014/012843
§ 371 (c)(1),
(2) Date: Jun. 15, 2016

(87) PCT Pub. No.: WO2015/099460
PCT Pub. Date: Jul. 2, 2015

(65) Prior Publication Data
US 2017/0361284 A1   Dec. 21, 2017

(30) Foreign Application Priority Data
Dec. 26, 2013  (KR) .................. 10-2013-0164307

(51) Int. Cl.
*B01D 67/00* (2006.01)
*B01D 69/12* (2006.01)
*B01D 71/56* (2006.01)

(52) U.S. Cl.
CPC ......... *B01D 71/56* (2013.01); *B01D 67/0088* (2013.01); *B01D 67/0097* (2013.01); *B01D 69/125* (2013.01)

(58) Field of Classification Search
None
See application file for complete search history.

(56) References Cited

U.S. PATENT DOCUMENTS

| 4,830,885 A | 5/1989 | Tran et al. |
|---|---|---|
| 2009/0159527 A1* | 6/2009 | Mickols ............... B01D 61/025 210/500.38 |
| 2013/0213880 A1 | 8/2013 | Hirozawa et al. |
| 2013/0248441 A1 | 9/2013 | Lee et al. |

FOREIGN PATENT DOCUMENTS

| CN | 101130444 A | 2/2008 |
|---|---|---|
| EP | 2168667 | 3/2010 |
| EP | 2633901 | 9/2013 |
| JP | 2002-095939 A | 4/2002 |
| JP | 2005-137964 A | 6/2005 |
| JP | 3860510 B2 | 12/2006 |
| JP | 2012-135757 A | 7/2012 |
| KR | 10-0474169 B1 | 3/2005 |
| KR | 1006923940000 | 3/2007 |
| KR | 10-2012-0059755 A | 6/2012 |
| KR | 10-1230843 B1 | 2/2013 |
| WO | 0243842 | 6/2002 |
| WO | 2012057028 A1 | 5/2012 |
| WO | 2012177465 | 12/2012 |

OTHER PUBLICATIONS

International Search Report from PCT/KR2014/012843, dated Mar. 31, 2015.
Written Opinion of the ISA from PCT/KR2014/012843, dated Mar. 31, 2015.
Office Action of Korean Patent Office in Appl'n No. 10-2014-0188722, dated May 20, 2016.

* cited by examiner

*Primary Examiner* — Krishnan S Menon
*Assistant Examiner* — Bradley R Spies
(74) *Attorney, Agent, or Firm* — Dentons US LLP (57) ABSTRACT

The present invention relates to a dry water treatment membrane having moisture content of 1% to 10%, and a method for manufacturing the same.

13 Claims, 2 Drawing Sheets

HIGH-FUNCTIONAL POLYAMIDE-BASED DRY WATER TREATMENT SEPARATOR AND METHOD FOR MANUFACTURING SAME

This application is a National Stage Application of International Application No. PCT/KR2014/012843, filed on Dec. 24, 2014, which claims the benefit of Korean Patent Application No. 10-2013-0164307, filed on Dec. 26, 2013, all of which are hereby incorporated by reference in their entirety for all purposes as if fully set forth herein.

TECHNICAL FIELD

The present specification claims priority to and the benefits of Korean Patent Application No. 10-2013-0164307, filed with the Korean Intellectual Property Office on Dec. 26, 2013, the entire contents of which are incorporated herein by reference.

The present disclosure relates to a polyamide-based water treatment membrane and a method for manufacturing the same, and in particular, to a polyamide-based dry water treatment membrane including a coating layer including a specific compound, and thereby having excellent moisture content and peel strength in a dry state, and consequently, having excellent salt rejection and permeate flow, and a method for manufacturing the same.

BACKGROUND ART

Developing a new source of water resources has surfaced as an urgent facing problem due to recent serious pollution of water quality environments and water shortage. Researches on the pollution of water quality environments aim for high-quality residential and industrial water, and treatment of various domestic sewage and industrial wastewater, and interests in water treatment processes using a separation membrane having an advantage of energy saving has been rising. In addition, accelerated reinforcement on environment regulations is expected to advance wide utilization of separation membrane technologies. Traditional water treatment processes are difficult to satisfy the tightened regulations, however, separation membrane technologies secure excellent treatment efficiency and stable treatment, therefore, are expected to become a leading technology in the field of water treatment in the future.

Liquid separation is divided into microfiltration, ultrafiltration, nanofiltration, reverse osmosis, stannizing, active transport, electrodialysis, and the like, depending on the pore of the membrane.

Specifically, typical examples of such a water treatment membrane include a polyamide-based water treatment membrane, and the polyamide-based water treatment membrane is manufactured using a method in which a fine porous support is formed by forming a polysulfone layer on non-woven fabric, and this fine porous support is immersed in an aqueous m-phenylenediamine (mPD) solution to form an mPD layer, and this mPD layer brings in contact with trimesoyl chloride (TMC) by being immersed in or coated on a TMC organic solvent, and is interfacial polymerized to form a polyamide active layer. According to the manufacturing method described above, a non-polar solvent and a polar solvent are in contact with each other, and polymerization occurs only at the interface, and as a result, a polyamide active layer having a very small thickness is formed.

Meanwhile, there is a qualification for a polyamide-based water treatment membrane to be commercially used, and it is having superior capabilities as a separation membrane such as high salt rejection and permeate flow. Salt rejection of a separation membrane commercially required is at least 97% or greater for brackish water, and an ability to have a relatively large amount of water passing through under a relatively low pressure, that is, a high flow property is required.

Meanwhile, such a water treatment membrane needs to have high salt rejection in order to be commercially used and desalinate in large quantities, and needs to have an excellent permeate flow property capable of passing excess water through even under a relatively low pressure. Accordingly, technology development for further enhancing salt rejection and permeate flow properties of a water treatment membrane has been required.

In addition, in existing polyamide-based water treatment membranes, pores of the active layer shrink when the separation membrane is re-dried, which causes a problem of significant decreases in salt rejection and permeate flow. Accordingly, in existing technologies, separation membranes have been manufactured in conditions immersed in a storage solution after being washed for removing unreacted materials and washed in DIW without re-drying the polyamide-based water treatment membrane. However, the separation membrane in a wet state has problems in that a process is inconvenient during a modulation process, and transporting costs are high.

DISCLOSURE

Technical Problem

In view of the above, an object of the present invention is to provide a polyamide-based dry water treatment membrane forming a coating layer with a composition including a glycerin compound on a polyamide active layer, and thereby having excellent peel strength and moisture content even after re-drying the separation membrane, and accordingly, having excellent salt rejection and permeate flow.

Technical Solution

One embodiment of the present specification provides a dry water treatment membrane including a porous support; a polyamide active layer provided on the porous support; and a coating layer including a glycerin compound provided on the polyamide active layer, wherein moisture content is from 1% to 10%.

Another embodiment of the present specification provides a dry water treatment membrane including a porous support; a polyamide active layer provided on the porous support; and a coating layer including a glycerin compound and polyvinyl alcohol (PVA) provided on the polyamide active layer, wherein moisture content is from 1% to 10%.

Another embodiment of the present specification provides a water treatment module including at least one or more of the dry water treatment membranes.

Another embodiment of the present specification provides a method for manufacturing a dry water treatment membrane, the method including forming an aqueous solution layer including an amine compound on a porous support; forming a polyamide active layer by bringing an organic solution including acyl halide into contact on the aqueous solution layer; surface coating the polyamide active layer with a composition including a glycerin compound; and drying the result.

Another embodiment of the present specification provides a method for manufacturing a dry water treatment membrane, the method including forming an aqueous solution layer including an amine compound on a porous support; forming a polyamide active layer by bringing an organic solution including acyl halide into contact on the aqueous solution layer; surface coating the polyamide active layer with a composition including a glycerin compound and polyvinyl alcohol (PVA); and drying the result.

Advantageous Effects

A dry water treatment membrane of the present invention has excellent peel strength and moisture content by including a coating layer formed with a composition including a glycerin compound on a polyamide active layer.

In addition, in the dry water treatment membrane of the present invention, pore shrinkage of a polyamide active layer or a moisture content decrease is prevented even in a dry state due to the presence of a glycerin compound, and accordingly, there is an advantage of having excellent salt rejection and permeate flow.

MODE FOR DISCLOSURE

Hereinafter, preferred embodiments of the present invention will be described. However, the embodiments of the present invention may be modified to various other forms, and the scope of the present invention is not limited to the embodiments described below. In addition, the embodiments of the present invention are provided in order to more completely describe the present invention for those having average knowledge in the art.

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

As a result of extensive studies for manufacturing a dry water treatment membrane having excellent moisture content and having excellent peel strength between a porous support and a polyamide active layer, the inventors of the present invention have found that, by coating a surface of a polyamide active layer formed on a porous support with a composition including a glycerin compound, salt rejection and permeate flow hardly decrease even in a dry state and peel strength is excellent as well, and have completed the present invention.

One embodiment of the present specification provides a dry water treatment membrane including a porous support; a polyamide active layer provided on the porous support; and a coating layer including a glycerin compound provided on the polyamide active layer, wherein moisture content is from 1% to 10%.

Another embodiment of the present specification provides a dry water treatment membrane including a porous support; a polyamide active layer provided on the porous support; and a coating layer including a glycerin compound and polyvinyl alcohol (PVA) provided on the polyamide active layer, wherein moisture content is from 1% to 10%.

Meanwhile, in the present specification, a wet separation membrane refers to a separation membrane in a wet state after forming a polyamide active layer through contacting and drying process of an amine compound and an acyl halide compound, and then going through a washing process with distilled water for removing foreign substances and the like, and existing water treatment membranes have been generally used and stored in the form of such a wet separation membrane.

On the other hand, the dry separation membrane according to one embodiment of the present specification is a separation membrane in a dry state manufactured additionally going through a process of re-drying the wet separation membrane, and according to one embodiment of the present specification, the re-drying process is carried out at a temperature of 20° C. to 80° C.

According to one embodiment of the present specification, the re-drying is a separate process from a drying process for forming a polyamide active layer, and refers to a process of drying again after obtaining a wet separation membrane through forming the polyamide active layer and then washing the result with distilled water for removing foreign substances, and the dry separation membrane may be manufactured through the re-drying.

According to one embodiment of the present specification, as the porous support, those in which a coating layer made of polymer materials is formed on nonwoven fabric may be used, and examples of the polymer material include polysulfone, polyethersulfone, polycarbonate, polyethylene oxide, polyimide, polyetherimide, polyetherketone, polypropylene, polymethylpentene, polymethyl chloride and polyvinylidene fluoride and the like, but are not limited thereto. Among these, using polysulfone is particularly preferable.

Meanwhile, according to one embodiment of the present specification, the polyamide active layer formed on the porous support may be formed by interface polymerization of an amine compound and an acyl halide compound, and herein, examples of the amine compound preferably include, but are not limited to, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or a mixture thereof. In addition, the acyl halide compound is an aromatic compound having two to three carboxylic acid halides, and examples thereof preferably include, but are not limited to, trimesoyl chloride, isophthaloyl chloride, terephthaloyl chloride, or a mixture thereof.

According to one embodiment of the present specification, the dry water treatment membrane includes a coating layer including a glycerin compound provided on the polyamide active layer. In addition, according to one embodiment of the present specification, the coating layer including a glycerin compound is formed by surface coating the polyamide active layer with a composition including a glycerin compound.

According to one embodiment of the present specification, the dry water treatment membrane includes a coating layer including a glycerin compound and polyvinyl alcohol (PVA) provided on the polyamide active layer. In addition, according to one embodiment of the present specification, the coating layer including a glycerin compound and polyvinyl alcohol is formed by surface coating the polyamide active layer with a composition including a glycerin compound and polyvinyl alcohol.

In other words, according to one embodiment of the present specification, the coating layer may be formed by surface coating the polyamide active layer with the composition, or may be formed using methods well known in the art, however, an application method, a spray method, a coating method and the like may be used instead of an immersion method.

According to one embodiment of the present specification, the coating layer may be formed as an incomplete membrane by coating the composition on a portion of the polyamide active layer surface, or may be formed as a complete membrane by coating the composition on the whole polyamide active layer surface.

According to one embodiment of the present specification, the coating layer including a glycerin compound may be formed using an aqueous solution including a glycerin compound, and may be formed by coating the aqueous solution including a glycerin compound on the polyamide active layer, and drying the result.

In addition, according to one embodiment of the present specification, the coating layer including a glycerin compound and polyvinyl alcohol may be formed using an aqueous solution including a glycerin compound and polyvinyl alcohol, or may be formed by coating the aqueous solution including a glycerin compound and polyvinyl alcohol on the polyamide active layer, and drying the result.

In the dry water treatment membrane according to one embodiment of the present specification, 90% by weight or greater of the glycerin compound of the total glycerin compound is included in the coating layer. In addition, the remaining glycerin compound other than the glycerin compound included in the coating layer may be present not only on the top of the polyamide active layer, but penetrating inside the polyamide active layer. Accordingly, the polyamide active layer may include a glycerin compound.

According to one embodiment of the present specification, the glycerin compound may have a concentration gradient in a thickness direction from the top of the polyamide active layer, and the concentration is the highest at the top surface and may decrease as going further inside the polyamide active layer. However, the glycerin compound is only present in the polyamide active layer, and not present in the porous support, and therefore, does not induce peel-off between the polyamide active layer and the porous support. In addition, the glycerin compound does not present at an interface of the polyamide active layer and the porous support, and accordingly, does not induce peel-off between the polyamide active layer and the porous support.

In other words, in the dry water treatment membrane according to one embodiment of the present specification, peel-off does not occur between the porous support and the polyamide active layer even after re-drying the separation membrane, and excellent salt rejection and permeate flow may be maintained. As a result, the water treatment membrane may be stored and distributed in a dry state.

In comparison, in existing water treatment membranes, a separation membrane is immersed in a composition including a glycerin compound, and therefore, the glycerin compound penetrates not only a polyamide active layer but also a porous support, which causes a problem of inducing peel off between the polyamide active layer and the porous support. In addition, in such existing water treatment membranes, the glycerin compound also penetrates an interface between the polyamide active layer and the porous support, which may induce peel-off between the polyamide active layer and the porous support.

In addition, in the dry water treatment membrane according to one embodiment of the present specification, 90% or greater of polyvinyl alcohol of the total polyvinyl alcohol is included in the coating layer, and the remaining polyvinyl alcohol may be present penetrating the polyamide active layer.

According to one embodiment of the present specification, the composition including a glycerin compound may include a solvent, and may be formed with a glycerin compound and a solvent.

Furthermore, according to one embodiment of the present specification, the composition including a glycerin compound and polyvinyl alcohol may include a solvent, and may be formed with a glycerin compound, polyvinyl alcohol and a solvent.

The glycerin compound according to one embodiment of the present specification is highly hydrophilic, and when a coating layer is formed with a composition including the glycerin compound, a dry water treatment membrane having excellent moisture content may be manufactured.

According to one embodiment of the present specification, the glycerin compound is preferably glycerin, polyglycerin, polyglycerin fatty acid ester or a mixture thereof. For example, although not limited thereto, the polyglycerin includes glycerin, diglycerin, triglycerin, tetraglycerin, hexaglycerin, heptaglycerin, octaglycerin, nonaglycerin, decaglycerin and the like. In addition, the polyglycerin fatty acid ester refers to a part or all of the hydroxyl groups of polyglycerin obtained by dehydration polymerizing glycerin being esterified with one or more types of fatty acids. Herein, the polyglycerin fatty acid ester is not limited as long as it is soluble in water, and examples thereof include those esterified using stearic acid, oleic acid, caprylic acid, lauric acid, myristic acid, behenic acid, erucic acid and the like as the fatty acid.

In addition, according to one embodiment of the present specification, the glycerin compound is more preferably a compound represented by the following Chemical Formula 1.

[Chemical Formula 1]

In Chemical Formula 1, n is an integer of 0 to 12, and preferably, n is from 0 to 4. The smaller the size of the molecules, more rigid the molecular structure becomes, and more advantageous effects may be expected therefrom since a hydrophilic group of the compound is capable of being continuously positioned toward the membrane surface after the compound is coated on a separation membrane.

According to one embodiment of the present specification, the solvent forming the composition is a polar solvent, and water may be normally used. In other words, coating may be carried out using an aqueous solution including the glycerin compound. In addition, the solvent forming the composition may further include alcohol.

Meanwhile, the composition according to one embodiment of the present specification may further include other additives as necessary within a scope not escaping the performance range of the present invention. For example, ketone, a surfactant, an antioxidant or the like may be further included, however, the additives are not limited thereto.

The dry water treatment membrane according to one embodiment of the present specification has moisture content of 1% to 10%. In other words, the dry water treatment membrane according to one embodiment of the present specification has excellent moisture content, and consequently, has excellent salt rejection and permeate flow. More specifically, as described in examples and comparative examples described later, the dry water treatment membrane of the present invention is cut into 15 cm×20 cm to prepare a specimen, the weight of the specimen is measured, the specimen is completely dried at 100° C., the weight after drying is measured, and the weight change is used as moisture content. Herein, the dry water treatment membrane of the present invention has moisture content of approximately 1% to 10%, preferably approximately 1% to 5%, and more preferably approximately 2% to 4%. When the moisture content satisfies the above-mentioned range, the dry separation membrane may have equal or more improved salt rejection and permeate flow compared to a wet separation membrane that does not go through a drying process, and the process becomes simple due to favorable rolling when manufacturing a module, and reduction in the process costs may be induced since defects are visually observed.

In addition, the water treatment membrane according to one embodiment of the present specification has salt rejection of 97% or greater, preferably 98% or greater, more preferably 99%, and even more preferably 99.2% or greater. When the water treatment membrane according to one embodiment of the present specification has salt rejection satisfying the above-mentioned range, excellent salt rejection is obtained, which allows the function as a water treatment membrane.

More specifically, according to one embodiment of the present specification, the dry water treatment membrane has salt rejection of 99.2% or greater and permeate flow of approximately 30 to 45 gallon/ft$^2$. day, and more preferably has salt rejection of 99.3% or greater and permeate flow of approximately 30 to 40 gallon/ft$^2$. day measured in a NaCl solution of 32000 ppm under the pressure of 800 psi in a dry state. Performance of a polyamide-based water treatment membrane greatly declines generally when drying the membrane, and on this account, the separation membrane needs to be maintained wet in a post-processing process and a modulation process of the separation membrane. However, in the dry water treatment membrane of the present invention, excellent performance is maintained even after drying a wet separation membrane.

In other words, existing water treatment membranes have been generally used stored and used in a wet state, and when drying the separation membrane, moisture included inside polyamide molecules as hydrogen bonds evaporates causing shrinkage of the pores of the polyamide active layer, and as a result, performance of the separation membrane declines. On the other hand, in the dry water treatment membrane according to one embodiment of the present specification, glycerin having a hydrophilic property is coated on the surface of the active layer keeping moisture of the separation membrane, moisture content is excellent and polyamide active layer shrinkage is prevented, and consequently, performance decline of the separation membrane may be prevented.

Meanwhile, the separation membrane according to one embodiment of the present specification has excellent peel strength between the polyamide active layer and the porous support. In other words, according to one embodiment of the present specification, peeled area between the polyamide active layer and the porous support after re-drying for 10 minutes at 50° C. is 5% or less, preferably 2% or less, more preferably 1% or less, even more preferably 0.1% or less with respect to the total area of the separation membrane, and still even more preferably, peel-off does not occur even after re-drying.

Specifically, as to be examined in the test examples of the present specification, the percentage of the peeled area with respect to the total area is 5% or less, preferably 2% or less, and more preferably 1% or less when a wet separation membrane manufactured using the manufacturing method of the present invention is re-dried for 10 minutes at a temperature of 50° C. to be a dry separation membrane. When the percentage of the peeled area is greater than 5%, salt rejection performance of the separation membrane greatly declines, and the membrane is difficult to be used as a dry water treatment membrane.

The dry water treatment membrane according to one embodiment of the present specification is capable of minimizing peel-off of the polyamide active layer, and more specifically, the percentage of the peeled area of the polyamide active layer is less than 1%, which is very superior peel strength compared to existing separation membranes including glycerin inside nonwoven fabric through a process of immersion in an aqueous glycerin solution. This induces an effect of maintaining the performance of a dry separation membrane by the polyamide active layer being stably maintained with the glycerin coating layer when drying the separation membrane.

In comparison, when an existing water treatment membrane immersed in a composition including a glycerin compound is re-dried in the comparative example of the present specification, occurrence of a peel-off phenomenon is identified, and the function as a water treatment membrane is not obtained when such a peel-off phenomenon occurs.

According to one embodiment of the present specification, the composition may include the glycerin compound in 1% by weight to 60% by weight, preferably approximately in 2% by weight to 50% by weight, more preferably in 5% by weight to 50% by weight, even more preferably in 10% by weight to 50% by weight, and still even more preferably approximately in 10% by weight to 30% by weight, with respect to the whole composition. When the content of the glycerin compound satisfies the above-mentioned range, a separation membrane may have proper moisture content, and economic feasibility may be obtained. In addition, performance decline caused by drying the separation membrane may be reduced.

Meanwhile, according to another embodiment of the present specification, the coating layer may further include alcohol, and the alcohol may be primary alcohol. In addition, according to one embodiment of the present specification, the composition including a glycerin compound, or the composition including a glycerin compound and polyvinyl alcohol may further include alcohol, and the alcohol may be primary alcohol. In other words, when the alcohol is further included as a solvent, an effect of enhancing performance uniformity of the dry water treatment membrane is obtained, and more specifically, a wetting property is enhanced by the addition of alcohol when the glycerin compound including glycerin is coated on the membrane surface. As a result, the glycerin compound is uniformly distributed and coated on the whole separation membrane due to such an enhanced wetting property, which is effective in preventing the overall membrane surface when re-drying the membrane. As a result, big differences by the presence of alcohol may not be shown in initial salt rejection and initial permeate flow, however, variations in the membrane performance significantly decrease when considering variations in the membrane formation.

According to one embodiment of the present specification, the alcohol is preferably included in 0.1% by weight to 20% by weight based on the content of the whole composition. In other words, the compound containing a glycerin compound according to one embodiment of the present specification including the alcohol in 0.1% by weight or greater based on the content of the whole composition is effective in significantly decreasing variations in the membrane performance, and containing the alcohol in 20% by weight or less is effective in preventing decline in the salt rejection of the membrane.

In the test examples of the present specification, it is identified that variations in the membrane performance are higher when the alcohol content is less than 0.1% by weight based on the content of the whole composition compared to a case having the alcohol content in a range of 0.1% by weight to 20% by weight, and it is identified that salt injection of the membrane declines when the alcohol content is 20% by weight or greater compared to a case having the alcohol content in a range of 0.1% by weight to 20% by weight.

Meanwhile, according to one embodiment of the present specification, the alcohol used as a solvent is preferably one or more selected from the group consisting of methanol, ethanol, propanol and isopropanol. It is due to the fact that alcohol having 3 or less carbon atoms as above is more effective since it is favorably dissolved in water.

According to one embodiment of the present specification, the composition including a glycerin compound may include polyvinyl alcohol, and, since polyvinyl alcohol is also a material retaining moisture as a hydrophilic polymer, using polyvinyl alcohol together with the glycerin compound is effective since the glycerin compound may be used in small amounts. In addition, compared to a case using only the glycerin compound, it is effective in enhancing durability against external physical factors such as scratches that may be applied from the outside by a polymer layer being coated on the top of a separation membrane surface.

According to one embodiment of the present specification, the polyvinyl alcohol content in the composition including a glycerin compound is from 0.1% by weight to 10% by weight with respect to the content of the whole composition, more preferably from 1% by weight to 8% by weight, and even more preferably from 1% by weight to 5% by weight.

According to one embodiment of the present specification, when the polyvinyl alcohol content in the composition including the glycerin compound is within the above-mentioned range, the glycerin compound may be used in small amounts from 1% by weight to 10% by weight, and more preferably from 2% by weight to 4% by weight.

In addition, the water treatment membrane according to one embodiment of the present specification has a salt rejection change rate and a permeate flow change rate of 0.1% or less and 5% or less, respectively, and preferably 0.05% or less and 5% or less, respectively, prior to and after scraping the surface once at a rate of 30 mm/s using a bar coater (Mayer barl; #50 wired bar), and the salt rejection change rate and the permeate flow change rate satisfying the above-mentioned range is very effective in that the water treatment membrane has resistance against damages and scratches that may occur during a manufacturing process.

Meanwhile, the dry water treatment membrane according to another embodiment of the present invention may be used for a microfiltration membrane, an ultrafiltration membrane, a nanofiltration membrane, a reverse osmosis membrane or the like, and may be particularly preferably used for a reverse osmosis membrane.

In addition, another embodiment of the present specification provides a water treatment module including at least one or more of the dry water treatment membranes described above.

According to one embodiment of the present specification, specific types of the water treatment module of the present invention are not particularly limited, and examples thereof include a plate & frame module, a tubular module, a hollow & fiber module, a spiral wound module or the like. In addition, the water treatment module of the present invention is not particularly limited in other constitutions and manufacturing methods as long as the water treatment module includes the dry water treatment membrane of the present invention, and general means known in the art may be employed without limit.

Meanwhile, the water treatment module according to one embodiment of the present specification has excellent salt rejection and permeate flow, and has excellent chemical stability, therefore, may be favorably used for water treatment equipment such as household/industrial water purification equipment, sewage treatment equipment and seawater desalination equipment.

Next, another embodiment of the present specification provides a method for manufacturing the dry water treatment membrane.

Specifically, one embodiment of the present specification provides a method for manufacturing a dry water treatment membrane including forming an aqueous solution layer including an amine compound on a porous support; forming a polyamide active layer by bringing an organic solution including acyl halide into contact on the aqueous solution layer; surface coating the polyamide active layer with a composition including a glycerin compound; and drying the result.

In addition, another embodiment of the present specification provides a method for manufacturing a dry water treatment membrane including forming an aqueous solution layer including an amine compound on a porous support; forming a polyamide active layer by bringing an organic solution including acyl halide into contact on the aqueous solution layer; surface coating the polyamide active layer with a composition including a glycerin compound and polyvinyl alcohol (PVA); and drying the result.

Descriptions on the composition including a glycerin compound and the composition including a glycerin compound and polyvinyl alcohol in the manufacturing method are the same as the descriptions on the compositions made above.

In the forming of an aqueous solution layer including an amine compound according to one embodiment of the present specification, amine compounds used for manufacturing water treatment membranes may be used as the amine compound without limit, and examples thereof may include aromatic multifunctional amines such as cyclohexanediamine, piperazine and piperazine derivatives; N, N-dimethyl-1,3-phenylenediamine, xylenediamine, benzidine, benzidine derivatives or mixtures thereof. Among these, aromatic multifunctional amines are preferable, and m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or a mixture thereof is preferable.

According to one embodiment of the present specification, a solvent of the aqueous amine solution is preferably a polar solvent such as water, and to the aqueous amine solution, additives such as triethylamine and camposulfonic acid may be further added as necessary.

According to one embodiment of the present specification, the method of forming an aqueous amine solution layer on a porous support does not exclude any method as long as it is a method capable of forming an aqueous solution on a support. For example, any method such as spray, application, immersion, dropping and the like is capable of being used.

According to one embodiment of the present specification, an additional step of selectively removing an excess aqueous solution including an amine compound may be included after the forming of the aqueous solution layer. When removing the excess aqueous solution as above, an interfacial polymerization layer is safely formed on the support, and a uniform layer may be formed. The removing of the excess aqueous solution may be carried out using a sponge, an air knife, nitrogen gas blowing, natural drying, a press roll or the like, but the method is not particularly limited thereto.

According to one embodiment of the present specification, when an aqueous amine solution layer is formed on a porous support after going through such a process, a polyamide active layer is formed by bringing an organic solution including an acyl halide compound into contact on the aqueous amine solution layer.

Herein, polyamide is produced by interfacial polymerization while the amine compound coated on the surface is reacted with the acyl halide compound, and a thin membrane is formed by the polyamide being adsorbed to a microporous support. As the method of contact, the polyamide active layer may also be formed through methods such as immersion, spray or coating.

According to one embodiment of the present specification, the acyl halide compound is an aromatic compound having 2 to 3 carboxylic acid halides, and while not being limited thereto, examples thereof preferably include trimesoyl chloride, isophthaloyl chloride, terephthaloyl chloride or a mixture thereof.

According to one embodiment of the present specification, as an organic solvent of the solution including the acyl halide compound, solvents that do not participate in the interfacial polymerization reaction, do not produce chemical bonds with the acyl halide compound, and do not damage the porous support layer are preferably used. As the organic solvent, an aliphatic hydrocarbon solvent, for example, hydrophobic liquids that are not mixed with water such as freons, hexane, cyclohexane, heptane and alkane having 5 to 12 carbon atoms, for example, alkane having 5 to 12 carbon atoms, and a mixture thereof such as Isol-C (Exxon Cor.) and Isol-G (Exxon Cor.) may be used.

In addition, according to one embodiment of the present specification, the contact time is favorably for approximately 1 minute to 5 hours, and more preferably approximately 1 minute to 3 hours. When the contact time is for less than 1 minute, the coating layer is not sufficiently formed, and when the contact time is for greater than 5 hours, the coating layer becomes too thick causing a negative effect of reducing permeate flow of a water treatment membrane.

Meanwhile, according to one embodiment of the present specification, when the polyamide active layer is formed on the porous support through a method such as above, a process of drying and washing the result may be selectively carried out. Herein, the drying is preferably carried out for approximately 1 minute to 10 minutes in an oven at 45° C. to 80° C.

In addition, according to one embodiment of the present specification, the washing is not particularly limited, and may be carried out in a basic aqueous solution. The basic aqueous solution capable of being used is not particularly limited, and for example, an aqueous sodium carbonate solution may be used, and specifically, the washing is preferably carried out for 1 hour to 24 hours in an aqueous sodium carbonate solution at 20° C. to 30° C.

Next, according to one embodiment of the present specification, the surface coating of the composition including a glycerin compound or the composition including a glycerin compound and polyvinyl alcohol on the polyamide active layer may be carried out using coating methods well known in the art, for example, methods such as an application method, a spray method and a coating method.

However, unlike the surface coating on the polyamide active layer, a method of immersing the whole water treatment membrane in a composition including a glycerin compound may cause peel-off of a polyamide active layer by the glycerin compound penetrating toward the nonwoven fabric or support, a surface opposite to the active layer. In this case, salt rejection greatly declines, and therefore, an application method, a spray method or a coating method, which is a method coating only the top of the polyamide active layer, is more preferably in the present invention. For example, coating may be carried out after putting a certain size guide on the surface of the prepared wet separation membrane, then pouring the composition containing a glycerin compound thereto, maintaining the result for approximately 1 minute to 5 minutes, and then draining the solution.

Lastly, according to one embodiment of the present specification, the drying is a step carried out for enhancing adhesion of the coating layer and the polyamide active layer after the coating layer is formed on the polyamide active layer using a method as above. In addition, by going through the drying, a wet separation membrane in a wet state, in which the coating layer is formed with the composition containing a glycerin compound, is turned into a dry separation membrane.

According to one embodiment of the present specification, the drying is preferably carried out for approximately 5 minutes to 60 minutes and preferably for 5 minutes to 30 minutes at approximately 25° C. to 65° C. When the drying is carried out for too short, a significant amount of moisture remains, and accordingly, an advantage of obtaining a dry separation membrane may not be obtained under a rolling and process condition, and the glycerin on the surface smears the back of the support causing peel-off of the polyamide active layer, which leads to a disadvantage of greatly reducing the performance of the separation membrane. In addition, when the drying is carried out for too long at high temperatures, the membrane may be dried to a level not suitable to obtain hydration and moisture absorption effects obtained by the glycerin, and it is not efficient in terms of a process as well.

Hereinafter, the present invention will be described in more detail with reference to more specific examples.

Preparation Example

A uniform liquid was obtained by placing 18% by weight of polysulfone solid in an N,N-dimethylformamide (DMF) solution and dissolving the solid for 12 hours or longer at 80° C. to 85° C. This solution was casted to a thickness of 45 um to 50 um on nonwoven fabric made of a polyester material and having a thickness of 95 um to 100 um. Next, a porous polysulfone support was prepared by placing the casted nonwoven fabric in water.

The porous polysulfone support prepared using the above-mentioned method was immersed in an aqueous solution including 2% by weight of meta-phenylenediamine, 1% by weight of triethylamine and 2.3% by weight of camphor-sulfonic acid for 2 minutes, then the excess aqueous solution on the support was removed using a 25 psi roller, and the result was dried for 1 minute at room temperature.

After that, the coated support was immersed in an organic solution including 0.1% by volume of trimesoyl chloride (TMC) in an Isol C solvent (SKC corp.) for 1 minute, and then the result was dried for 10 minutes in an oven at 60° C. in order to remove the excess organic solution.

The separation membrane obtained using the above-mentioned method was immersed in 0.2% by weight of an aqueous sodium carbonate solution for 2 hours or longer, and then washed again with distilled water for 1 minute, and as a result, a wet water treatment membrane having a polyamide active layer with a thickness of 200 um was prepared.

Example 1

A 5% by weight glycerin aqueous solution was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 2

A dry water treatment membrane was manufactured in the same manner as in Example 1 except that the aqueous glycerin solution was used in 10% by weight instead of 5% by weight.

Example 3

A dry water treatment membrane was manufactured in the same manner as in Example 1 except that the aqueous glycerin solution was used in 30% by weight instead of 5% by weight.

Example 4

A dry water treatment membrane was manufactured in the same manner as in Example 1 except that the aqueous glycerin solution was used in 50% by weight instead of 5% by weight.

Example 5

A solution including 30% by weight of glycerin, 1% by weight of ethanol, and water in the remaining quantity was surface coated for 3 minutes on the polyamide active layer of the wet water treatment membrane prepared in the preparation example. After that, the excess glycerin-including solution remaining on the surface was drained off, and the result was dried for 10 minutes in an oven at 50° C. to manufacture a dry water treatment membrane.

Example 6

A solution including 30% by weight of glycerin, 5% by weight of ethanol, and water in the remaining quantity was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 7

A solution including 30% by weight of glycerin, 10% by weight of ethanol, and water in the remaining quantity was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 8

A solution including 30% by weight of glycerin, 0.01% by weight of ethanol, and water in the remaining quantity was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 9

A solution including 30% by weight of glycerin, 30% by weight of ethanol, and water in the remaining quantity was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 10

A solution including 2% by weight of glycerin, 2% by weight of polyvinyl alcohol (PVA), and water in the remaining quantity was surface coated for 3 minutes on the polyamide active layer of the wet water treatment membrane prepared in the preparation example. After that, the excess aqueous glycerin solution remaining on the surface was drained off, and the result was dried for 10 minutes in an oven at 50° C. to manufacture a dry water treatment membrane.

Example 11

A solution including 2% by weight of glycerin, 2% by weight of polyvinyl alcohol (PVA), 5% of ethanol, and water in the remaining quantity was surface coated for 3 minutes on the polyamide active layer of the wet water treatment membrane prepared in the preparation example. After that, the excess aqueous solution remaining on the surface was drained off, and the result was dried for 10 minutes in an oven at 50° C. to manufacture a dry water treatment membrane.

Comparative Example 1

A dry water treatment membrane was manufactured by drying the wet water treatment membrane prepared in the preparation example for 10 minutes in an oven at 50° C.

Comparative Example 2

The wet water treatment membrane prepared in the preparation example was used as in the form of a wet water treatment membrane without drying.

Comparative Example 3

A dry water treatment membrane was manufactured in the same manner as in Example 1 except that the aqueous glycerin solution was used in 0.1% by weight instead of 5% by weight.

Comparative Example 4

The whole wet water treatment membrane prepared in the preparation example was immersed for 3 minutes in a 5% by weight aqueous glycerin solution. After that, the excess remaining aqueous glycerin solution was drained off, and the result was dried for 10 minutes in an oven at 50° C. to manufacture a dry water treatment membrane.

Comparative Example 5

The whole wet water treatment membrane prepared in the preparation example was immersed for 3 minutes in a 50% by weight aqueous glycerin solution. After that, the excess remaining aqueous glycerin solution was drained off, and the result was dried for 10 minutes in an oven at 50° C. to manufacture a dry water treatment membrane.

Test Example 1—Measurements on Initial Salt Rejection and Initial Permeate Flow

Initial salt rejection and initial permeate flow of the water treatment membranes manufactured in the examples and the comparative examples were evaluated as follows. Initial salt rejection and initial permeate flow were measured while each supplying an aqueous sodium chloride solution to a concentration of 32,000 ppm under a pressure of 800 psi with a flow rate of 4500 mL/min at 25° C. Water treatment membrane cell equipment used in the membrane evaluation was equipped with a flat-type permeation cell, a high pressure pump, a storage tank and cooling equipment, and the structure of the flat-type permeation cell was a cross-flow type with a valid permeation area of 140 cm². After the washed water treatment membrane was installed in the permeation cell, sufficient preliminary operation was carried out for approximately 1 hour using distilled water that is distilled three times for evaluation equipment stabilization. Next, an equipment operation was carried out for approximately 1 hour after changing to an aqueous sodium chloride solution having a concentration of 32,000 ppm until a pressure and permeate flow reached a stationary state, and flow was calculated by measuring the amount of water permeated for 10 minutes, and salt rejection was calculated by analyzing the salt concentration before and after permeation using a conductivity meter. The measurement results are shown in the following Table 1.

Test Example 2—Evaluation on Moisture Content

Moisture content of the water treatment membranes manufactured in the examples and the comparative examples was evaluated as follows. A specimen was prepared after the water treatment membranes were each manufactured according to the examples and the comparative examples and cut into 15 cm×20 cm, and the weight of the specimen was measured, and then the weight of the specimen was measured after completely drying the specimen in an oven at 100° C., and the weight change rate was employed as moisture content as shown in the following Mathematical Formula 1. The measurement results are shown in the following Table 1.

[Mathematical Equation 1]

$$\text{Moisture Content} = \frac{\left(\begin{array}{l}\text{Weight of Specimen Before Completely Drying}-\\ \text{Weight of Specimen After Completely Drying}\end{array}\right)}{\text{Weight of Specimen Before Completely Drying}}$$

Test Example 3—Evaluation on Peel Strength

Peel strength of the water treatment membranes manufactured in the examples and the comparative examples was evaluated as follows. A specimen was prepared after the water treatment membranes were each manufactured according to the examples and the comparative example and cut into 15 cm×20 cm.

Figure 1:
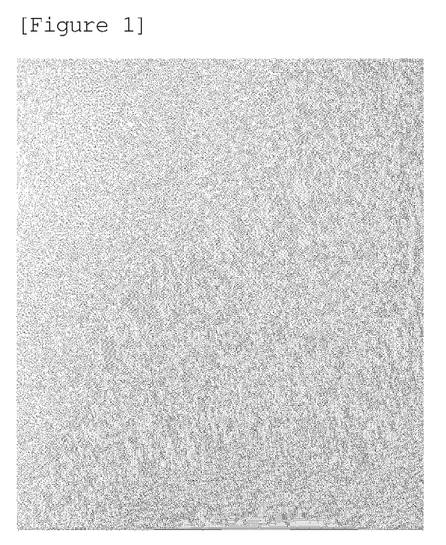
FIG. 1 is a picture of a surface of a separation membrane manufactured in Example 3.
Figure 3:
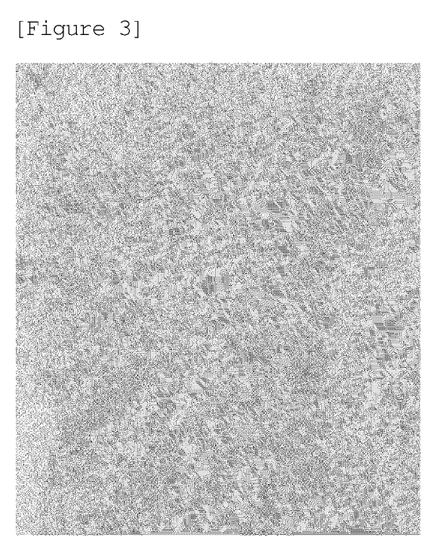
FIG. 3 is a picture of a surface of a separation membrane manufactured in Comparative Example 4.

Herein, the peel strength was examined by identifying the presence of a dyed separation membrane surface after dyeing the surface of the dry water treatment membrane with a Rhodamine dye. The measurement results are shown in the following Table 1. "No" in the following Table 1 means that no peel-off occurred in the separation membrane, and "yes" means that peel-off occurred in the separation membrane, and the separation membrane surface was dyed with the Rhodamine dye. Herein, pictures of the surfaces after evaluating the peel strength of the water treatment membranes of Example 3 and Comparative Example 4 are shown in FIG. 1 and FIG. 3, respectively.

TABLE 1

| | Initial Value | | | |
| Category | Salt Rejection (%) | Permeate flow (GFD) | Moisture Content (%) | Peel Strength Evaluation |
| --- | --- | --- | --- | --- |
| Example 1 | 99.38 | 30.25 | 1.17 | No |
| Example 2 | 99.40 | 31.97 | 1.85 | No |
| Example 3 | 99.43 | 35.71 | 2.84 | No |
| Example 4 | 99.42 | 35.67 | 3.65 | No |
| Example 5 | 99.37 | 34.57 | 3.47 | No |
| Example 6 | 99.47 | 36.05 | 3.68 | No |
| Example 7 | 99.41 | 35.84 | 3.58 | No |
| Example 8 | 99.40 | 35.07 | — | — |
| Example 9 | 99.10 | 37 | — | — |
| Example 10 | 99.47 | 33.82 | 2.93 | No |

TABLE 1-continued

| | Initial Value | | | |
|---|---|---|---|---|
| Category | Salt Rejection (%) | Permeate flow (GFD) | Moisture Content (%) | Peel Strength Evaluation |
| Example 11 | 99.44 | 34.80 | 3.05 | No |
| Comparative Example 1 | 99.10 | 27.27 | 0.86 | No |
| Comparative Example 2 | 99.42 | 35.36 | — | No |
| Comparative Example 3 | 99.24 | 29.10 | 0.97 | No |
| Comparative Example 4 | 98.07 | 31.55 | — | Yes |
| Comparative Example 5 | 89.13 | 39.49 | — | Yes |

Through the measurement results of Comparative Example 1 in Table 1, it was seen that the water treatment membrane without a coating layer had significantly decreased salt rejection and permeate flow in a dry state. However, the water treatment membrane having a coating layer including a glycerin compound exhibited significantly superior performance in salt rejection and permeate flow compared to the dry water treatment membrane without a coating layer (Comparative Example 1). In addition, even in a dry state, it was identified that initial salt rejection is maintained at the same level as the water treatment membrane in a wet state (Comparative Example 2), and a decrease rate in the permeate flow was very small.

Figure 2:
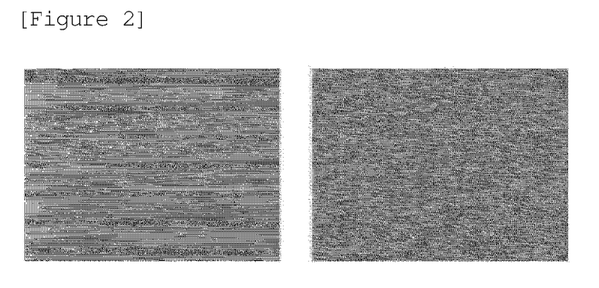
FIG. 2 is a picture of a surface of a separation membrane manufactured in Example 10 after carrying out durability evaluation on the separation membrane.

Meanwhile, in the dry water treatment membrane manufactured in Example 3 (FIG. 1), dyed fractions were not seen in the separation membrane even when the surface was treated with a Rhodamine dye, as shown in FIG. 1 to FIG. 3. On the other hand, in the dry separation membrane of Comparative Example 4 (FIG. 3) manufactured through an immersion process, it was identified that the porous support and the polyamide active layer were peeled off, and Rhodamine reacted with a polysulfone layer that is a support, and as a result, the separation membrane was dyed in red.

Test Example 4—Evaluation on Variations in Membrane Performance

Variations in the membrane performance of the dry water treatment membranes manufactured in Examples 3 and 5 to 7 were evaluated using a method of preparing a specimen by cutting the sample of each example into 8 each with a size of 10.5 cm×7 cm, measuring performance of each of the samples, and calculating a standard deviation. The measurement results are shown in Table 2.

Test Example 5—Evaluation on Durability

Durability of the water treatment membranes manufactured in Examples 3, 5 to 11 and Comparative Example 1 was evaluated as follows. The dry water treatment membranes manufactured in Examples 3, 5 to 8 and 11 and Comparative Example 1 were stored in a sealed container for 2 weeks at room temperature, and initial salt rejection and initial permeate flow were measured again. The measurement results are shown in Table 2.

TABLE 2

| | Two Weeks after Storage | | Change Rate | | Performance Variation | |
|---|---|---|---|---|---|---|
| Category | Salt Rejection (%) | Permeate Flow (GFD) | Salt Rejection (%) | Permeate Flow (%) | Salt Rejection (%) | Permeate Flow (%) |
| Example 3 | 99.45 | 36.88 | 0.02 | 3.28 | 2.10 | 1.07 |
| Example 5 | 99.42 | 34.95 | 0.01 | 0.38 | 0.83 | 0.40 |
| Example 6 | 99.46 | 37.05 | 0.01 | 2.77 | 0.15 | 0.07 |
| Example 7 | 99.47 | 36.53 | 0.06 | 1.92 | 0.13 | 0.07 |
| Example 8 | 99.42 | 34.87 | 0.02 | 0.2 | 1.86 | 0.72 |
| Example 10 | — | — | — | — | 1.69 | 1.25 |
| Example 11 | 99.46 | 34.17 | 0.02 | 0.63 | 0.71 | 0.38 |
| Comparative Example 1 | 97.10 | 18.27 | 2.02 | 33.00 | 3.14 | 2.21 |

As seen in Examples 3, 5 to 8 and 11 in Table 2, it was seen that salt rejection and permeate flow did not change much even after storing the separation membrane in air for a long period of time of 2 weeks. In addition, as seen in Example 3 and Examples 5 to 7, initial salt rejection and initial permeate flow were not much different when adding ethanol as a solvent to the composition including glycerin, however, variations in the membrane performance significantly decreased considering the variations in the membrane.

However, in Example 8, it was identified that salt rejection and permeate flow did not change much even after storing the separation membrane in air for a long period of time of 2 weeks, however, an added amount of ethanol was too small and variations in the performance depending on the regions of the membrane were, compared to Examples 5 to 7 were large. In addition, as seen in Example 9 of Table 1, salt rejection decline in the membrane by the addition of excess alcohol was identified.

Furthermore, when comparing Examples 10 and 11, it was identified that, when the composition forming a coating layer of the water treatment membrane includes glycerin, polyvinyl alcohol and ethanol (Example 11), variations in the performance of salt rejection and permeate flow decreased compared to a case including glycerin and polyvinyl alcohol (Example 10), as seen in Table 2.

Test Example 6—Evaluation on Durability

Durability of the water treatment membranes manufactured in Example 10 and Comparative Example 1 was evaluated as follows. After a durability test scraping the surface of the water treatment membranes manufactured in Example 10 and Comparative Example 1 once at a rate of 30 mm/s using a bar coater (Mayer bar; #50 wired bar), a salt rejection change rate and a permeate flow change rate were measured.

TABLE 3

| Category | Initial | | After Durability Test | |
|---|---|---|---|---|
| | Salt Rejection (%) | Permeate Flow (GFD) | Salt Rejection (%) | Permeate Flow (GFD) |
| Example 10 | 99.47 | 33.82 | 99.46 | 34.01 |
| Comparative Example 1 | 99.1 | 27.27 | 97.51 | 29.03 |

FIG. 2 shows the surface image of the separation membrane after evaluating durability of the water treatment membrane manufactured in Example 10 using the method described in Test Example 6. In addition, as seen in Table 3, it was identified that, the water treatment membrane manufactured in Example 10 had, by further including polyvinyl alcohol in the glycerin compound-containing composition, smaller salt rejection change rate and permeate flow change rate compared to the water treatment membrane manufactured in Comparative Example 1, and as the salt rejection change rate and the permeate flow change rate become smaller, resistance of the water treatment membrane against damages and scratches that may occur during a manufacturing process is excellent. Consequently, it was identified from Test Example 6 that the water treatment membrane including a coating layer formed with a composition containing polyvinyl alcohol and glycerin had excellent durability.

Hereinbefore, examples of the present invention have been described in detail, however, claims of the present invention are not limited thereto, and it will be apparent to those skilled in the art that various modifications and changes may be made without departing from the technological ideas of the present invention described in the claims.

The invention claimed is:

1. A dry water treatment membrane comprising:
a porous support;
a polyamide active layer provided on the porous support; and
a coating layer provided only on the polyamide active layer, the coating layer comprising:
a glycerin compound that is a glycerin, a polyglycerin, a polyglycerin fatty acid ester or a mixture thereof;
polyvinyl alcohol (PVA); and
a $C_1$-$C_3$ alcohol;
wherein the dry water treatment membrane has a moisture content that is from 1% to 10%; and
wherein the glycerin compound and the PVA of the coating layer have a concentration gradient in a thickness direction, the concentration being highest at a top surface of the coating layer and decreasing inside the polyamide active layer, with no glycerin compound present at an interface of the polyamide active layer and the porous support, and no glycerin compound in the porous support;
wherein the coating layer is a dried coating composition including the glycerin compound, the PVA and the $C_1$-$C_3$ alcohol; and
wherein the $C_1$-$C_3$ alcohol is present in the coating composition in an amount from 0.1% by weight to 20% by weight with respect to the weight of the coating composition.

2. The dry water treatment membrane of claim 1, wherein the glycerin compound is a compound of Chemical Formula 1:

[Chemical Formula 1]

wherein n is an integer of 0 to 12.

3. The dry water treatment membrane of claim 1, wherein 90% by weight or greater of the glycerin compound of the total amount of the glycerin compound in the coating layer remains in the coating layer on the polyamide layer.

4. The dry water treatment membrane of claim 1, which has salt rejection of 97% or greater and permeate flow of 30 to 45 gallon/ft$^2$·day in a dry state.

5. The dry water treatment membrane of claim 1, which has a peeled area between the polyamide active layer and the porous support of 5% or less with respect to the total area of the separation membrane after being re-dried for 10 minutes at 50° C.

6. The dry water treatment membrane of claim 1, wherein the glycerin compound is present in the coating composition in an amount from 1% by weight to 60% by weight with respect to the weight of the coating composition.

7. The dry water treatment membrane of claim 1, wherein the alcohol is any one or more selected from the group consisting of methanol, ethanol, propanol and isopropanol.

8. The dry water treatment membrane of claim 1, wherein the coating composition further includes one or more compounds selected from the group consisting of a ketone, a surfactant and an antioxidant.

9. A water treatment module comprising the dry water treatment membrane of claim 1.

10. A method for manufacturing a dry water treatment membrane, the method comprising:
forming an aqueous solution layer including an amine compound on a porous support;
forming a polyamide active layer by bringing an organic solution including acyl halide into contact on the aqueous solution layer;
surface coating only the polyamide active layer with a coating composition comprising:
a glycerin compound that is a glycerin, a polyglycerin, a polyglycerin fatty acid ester or a mixture thereof;
polyvinyl alcohol (PVA); and
a $C_1$-$C_3$ alcohol; and
drying the result;
wherein the glycerin compound and the PVA of the coating layer have a concentration gradient in a thickness direction, the concentration being highest at a top surface of the coating layer and decreasing inside the polyamide active layer, with no glycerin compound present at an interface of the polyamide active layer and the porous support, and no glycerin compound in the porous support, and
wherein the $C_1$-$C_3$ alcohol is present in the coating composition in an amount from 0.1% by weight to 20% by weight with respect to the weight of the coating composition.

11. The method for manufacturing a dry water treatment membrane of claim 10, wherein the surface coating is carried out using an application method, a spray method or a coating method.

12. The method for manufacturing a dry water treatment membrane of claim 10, wherein the drying is carried out for 5 minutes to 60 minutes at a temperature in a range of from 25° C. to 65° C.

13. The dry water treatment membrane of claim 1, wherein 90% by weight or greater of the PVA in the coating layer remains in the coating layer, the remaining PVA penetrating inside the polyamide active layer.

\* \* \* \* \*